W. A. GEIGER.
FRICTION GEAR.
APPLICATION FILED FEB. 5, 1917.
1,283,146.
Patented Oct. 29, 1918.
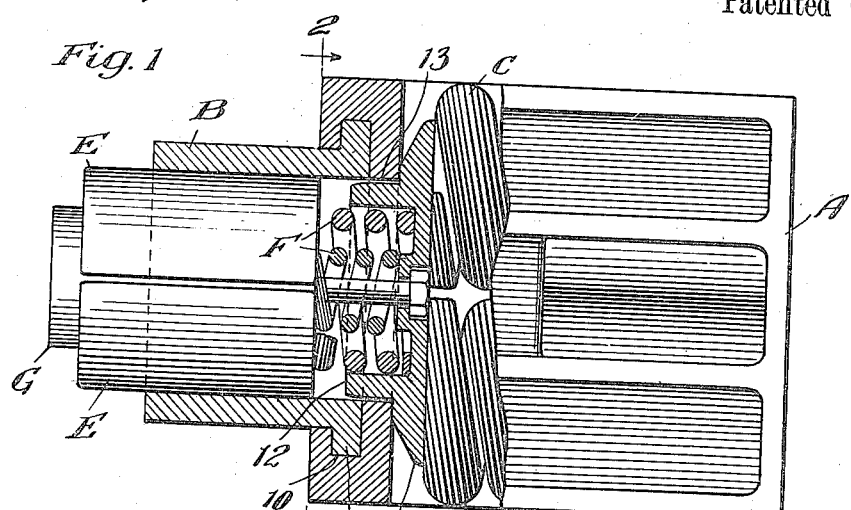
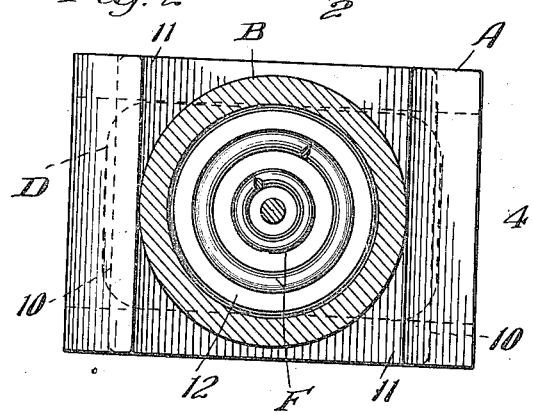
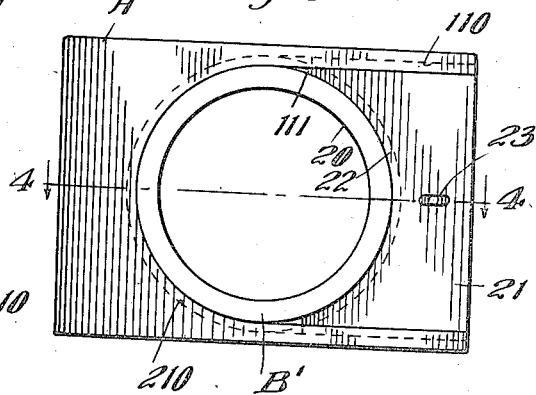
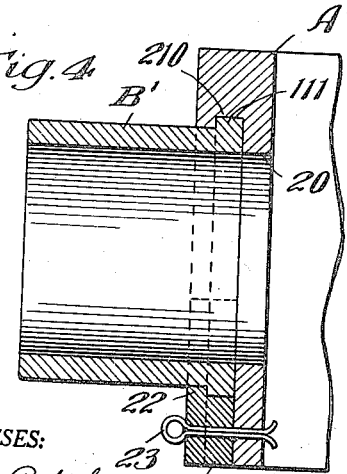
WITNESSES:
Calvin B. Patch.
INVENTOR.
William A. Geiger
BY George I. Haight
ATTORNEY

UNITED STATES PATENT OFFICE.

WILLIAM A. GEIGER, OF CHICAGO, ILLINOIS, ASSIGNOR TO WILLIAM H. MINER, OF CHAZY, NEW YORK.

FRICTION-GEAR.

1,283,146.  Specification of Letters Patent.  Patented Oct. 29, 1918.

Application filed February 5, 1917. Serial No. 146,588.

*To all whom it may concern:*

Be it known that I, WILLIAM A. GEIGER, a citizen of the United States, residing at Chicago, in the county of Cook and State of Illinois, have invented a certain new and useful Improvement in Friction-Gears, of which the following is a full, clear, concise, and exact description, reference being had to the accompanying drawings, forming a part of this specification.

This invention relates to improvements in friction gears. The object of the invention is to provide a combined friction shell and spring cage for a friction gear, wherein the friction shell is detachably connected to the cage to thereby permit replacement when desired.

Another and more specific object of the invention is to provide an arrangement of the type above indicated and wherein the friction shell is retained in position with respect to the cage by elements of the shock absorbing means.

In the drawing forming part of this specification, Figure 1 is a part longitudinal section, part top plan of a friction gear showing my improvements in connection therewith. Fig. 2 is a transverse vertical sectional view of the structure illustrated in Fig. 1 and taken on the line 2—2 thereof. Fig. 3 is a front end elevation of a spring cage showing another embodiment of the invention. And Fig. 4 is a horizontal sectional view taken on the line 4—4 of Fig. 3 with the friction shell in position.

Referring first to the construction illustrated in Figs. 1 and 2, A denotes a spring cage, B a friction shell, C—C the main springs of the friction gear, D a spring follower, E—E friction shoes, G a wedge, and F—F preliminary springs.

The spring cage is, broadly speaking, of a well known form and is substantially of longitudinal box-like construction having upper and lower walls connected by an integral rear wall and open at its sides to permit the insertion of the springs and follower. At its front end, the cage A is recessed and provided with opposite under-cut grooves 10—10, which are adapted to accommodate laterally extended flanges 11—11 formed integrally with the friction shell B at the rear end of the latter. The construction is such that the shell and cage are assembled by moving the shell transversely of the cage A, that is, at right angles to the axis of the gear. After the shell and cage are thus assembled, the springs C and follower D are inserted and it will be noted that the follower D is provided with a forwardly extended annular collar 12, which extends within the shell B. After the springs and follower have been inserted, the preliminary springs F—F are applied, then the shoes and wedge.

With the arrangement above described, it is apparent that the shell and cage are easily assembled and when the other parts of the gear are in position, displacement of the shell relative to the cage is prevented by the annular collar on the follower D, when the parts are in normal position. Upon actuation of the gear, the wedge and shoes will be forced inwardly until the preliminary springs are compressed, during which time the follower D will remain stationary. Upon continued inward movement of the friction elements, it is apparent that the shoes will be in engagement with the collar of the follower D, and hence, as the follower is forced inwardly the shoes will be projected beyond the inner end of the shell B and within the corresponding recess 13 in the front wall of the cage, so that the shoes will perform the function normally performed by the collar 12 of holding the shell and cage in proper relation.

In the construction illustrated in Figs. 3 and 4, the cage A' is provided with upper and lower under-cut grooves 110—110, which extend inwardly from one side of the cage and merge into a semi-circular under-cut groove 210. The shell B' which coöperates with the cage A' is provided with an annular flange 111 at its inner end which fits the recess provided in the forward face of the cage, the shell being assembled by moving the same transversely of the cage A' until it is alined with the circular recess 20 of the latter. In this construction, the spring follower can also be employed to retain the shell in position but as an additional means for accomplishing this purpose, I also employ a slide or plate 21 which is slipped within the recess provided on the cage, said slide being extended within the under-cut groove 110 and having a semi-circular inner edge 22 which fits over the adjacent portion of the flange 111 of the cylinder or shell B'. To retain the plate 21 in position a cotter 23 may be used, which is extended through suitable perforations in the plate and front wall of the cage.

By means of the foregoing described construction, it is apparent that the shell may be renewed whenever desired without the necessity of scrapping the rest of the friction gear, thus providing for a longer life at a minimum expense, since the friction shell is the part which wears out the most rapidly.

I claim:

1. In a device of the character described, the combination with a spring cage, of a separately formed friction shell, springs within the cage, a follower at the forward ends of the springs, and means for detachably connecting the shell and cage comprising, under-cut grooves in one of said members and coöperating flanges on the other of said members, the cage and shell being assembled by moving the one transversely to the other, said follower having an extension normally positioned within the shell and thereby adapted normally to prevent separation of the shell and cage.

2. In a friction shock-absorbing mechanism of the character described, the combination with a spring cage having an opening in one end wall thereof, said wall being provided on its outer side with under-cut grooves, of a friction shell having flanges at its inner end, said flanges being adapted to be positioned within said grooves by sliding the shell transversely of the cage, elements including springs, a follower and friction devices, and means on one of said elements for retaining the shell and cage in assembled relation when the parts are in normal position.

3. In a device of the character described, the combination with a spring cage having transversely extending under-cut grooves across the outer face of one wall thereof, said wall being also centrally recessed, of springs within said cage, a follower within said cage and having an annular collar extending through said recess, a friction shell having a flange at its rear end engageable within said under-cut grooves, the shell being assembled with the cage by moving the shell transversely of the cage, said collar on the follower also extending within the shell and normally preventing movement of the latter relatively to the cage.

4. In a device of the character described, the combination with a spring casing having a substantially circular opening in one end wall thereof, of a substantially cylindrical friction shell, said casing having grooves extending transversely thereof in said end wall adjacent the opening and said shell having laterally extended flanges adapted to be positioned within said grooves, the shell and casing being assembled by movement of the shell transversely relatively to the casing, spring means within said casing, and a follower at the end of said spring means adjacent said end wall of the casing, said follower having an annular flange extending through said opening in said end wall and partly within the rear end of said shell to thereby prevent accidental movement of said shell transversely of the casing.

In witness that I claim the foregoing I have hereunto subscribed my name this 31st day of Jan. 1917.

WILLIAM A. GEIGER.

Witness:
JOSEPH HARRIS.